US008489491B2

(12) United States Patent  
Gulati et al.

(10) Patent No.: US 8,489,491 B2  
(45) Date of Patent: *Jul. 16, 2013

(54) METHOD OF MANAGING FINANCIAL INSTRUMENTS, EQUIPMENT LEASE DERIVATIVES AND OTHER COLLATERAL INSTRUMENTS, DATA ARCHITECTURE, APPLICATION AND PROCESS PROGRAM

(75) Inventors: Deepak Gulati, New York, NY (US); Robert E. Beverly, IV, La Pinada, CA (US)

(73) Assignee: Digitech Information Systems, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/658,087

(22) Filed: Feb. 1, 2010

(65) Prior Publication Data

US 2010/0250464 A1 Sep. 30, 2010

Related U.S. Application Data

(63) Continuation of application No. 10/475,372, filed as application No. PCT/US02/19424 on Jun. 17, 2002, now Pat. No. 7,739,180.

(60) Provisional application No. 60/299,367, filed on Jun. 19, 2001.

(51) Int. Cl.  
*G06Q 40/00* (2012.01)

(52) U.S. Cl.  
USPC .. 705/37; 707/3; 707/E17.044; 707/E17.014; 709/202; 709/204; 705/35

(58) Field of Classification Search  
CPC ................................ G06Q 40/00; G06Q 50/00  
USPC .............. 705/1–50; 709/200–205; 707/5–27  
See application file for complete search history.

(56) References Cited

U.S. PATENT DOCUMENTS

| 5,220,500 A | 6/1993 | Baird et al. |
| 5,802,501 A | 9/1998 | Graff |

(Continued)

FOREIGN PATENT DOCUMENTS

| EP | 1047009 | 10/2000 |
| JP | 2002140516 | 5/2002 |

(Continued)

OTHER PUBLICATIONS webpage staff, LAW No. 12/1998 for Licensing Lease and Investment Companies, Dec. 1998, pp. 1-2.*

(Continued)

*Primary Examiner* — Marissa Liu  
(74) *Attorney, Agent, or Firm* — Cooper & Dunham LLP

(57) ABSTRACT

A computer-implemented process ad methodology that selects collateral instruments such as equipment leases, using mathematical models, based on selection criteria, risk-reward relationships, and maturity needs resulting in the creation of new financial instrument derivatives. These new derivatives allow for creation of secured private equity, public equity, mutual funds and venture capital funds where the investors' principal is safeguarded against loss regardless of the performance of the investments being made. A two-tier investment structure is created whereby the principal amounts from the fund are invested in specially identified high yield vehicles such as residual equipment leases with high yields over certain maturities. The high yield cash flow only is then invested in higher risk investments such as venture capital start-ups companies.

14 Claims, 11 Drawing Sheets

Collect Buyer Entry Variables

U.S. PATENT DOCUMENTS

| | | | |
|---|---|---|---|
| 6,070,151 | A | 5/2000 | Frankel |
| 6,167,384 | A | 12/2000 | Graff |
| 6,233,566 | B1 | 5/2001 | Levine et al. |
| 6,298,333 | B1 | 10/2001 | Manzi et al. |
| 6,330,547 | B1 | 12/2001 | Martin |
| 6,622,129 | B1 | 9/2003 | Whitworth |
| 2001/0029474 | A1 | 10/2001 | Yada |
| 2001/0034695 | A1 | 10/2001 | Wilkinson |
| 2001/0042034 | A1 | 11/2001 | Elliott |
| 2002/0032586 | A1 | 3/2002 | Joao |
| 2002/0042770 | A1 | 4/2002 | Slyke et al. |
| 2002/0046144 | A1 | 4/2002 | Graff |
| 2002/0065739 | A1 | 5/2002 | Florance et al. |
| 2002/0065753 | A1* | 5/2002 | Schloss et al. ............... 705/35 |
| 2002/0174046 | A1* | 11/2002 | Mistretta .................. 705/36 |
| 2004/0148240 | A1* | 7/2004 | Gulati et al. ................ 705/36 |
| 2005/0289036 | A1 | 12/2005 | Lacombe, Jr. et al. |

FOREIGN PATENT DOCUMENTS

| | | |
|---|---|---|
| WO | 0034911 | 6/2000 |
| WO | 0046717 | 8/2000 |
| WO | 0055754 | 9/2000 |
| WO | 0137118 | 5/2001 |
| WO | 0182188 | 11/2001 |
| WO | 0237211 | 5/2002 |
| WO | 0242980 | 5/2002 |

OTHER PUBLICATIONS

*Digitech Information Systems, Inc.* v. *Ally Financial Inc. et al.*, Case No. 6:10-cv-1398-Orl-28-JA-KRS, First Supplemental Response to First Set of Interrogatories to Plaintiff, Jun. 29, 2011. See p. 9.
Amended and Restated Origination Agreement Between Central Originating Lease Trust and General Motors Acceptance Corporation, Apr. 30, 1997.
Litwin et al., "New Developments In Equipment And Auto Lease Financing: Securitization, Leveraged Leasing and Titling Trusts," Equipment Leasing-Leveraged Leasing, 2nd Ed., Feb. 2000 Aspen Law & Business.
Salomon Smith Barney et al., Prospectus for Issuance of Asset Backed Senior Notes by BMW Vehicle Lease Trust 2000-A, Nov. 6, 2000 Rule 424(B)(1) SEC Filing, available at <<http://sec.gov/Archives/edgar/data/1120604/000095011000001150/0000950110-00-001150.txt>>.
NationsBanc Montgomery Securities LLC, Prospectus Supplement and Prospectus re Mortgage Pass-Through Certificates, Series 1998-7 by BA Mortgage Securities, Inc., Dec. 17, 1998 Rule 424(b)(5) SEC Filing.
Chase Manhattan Bank USA et al., Prospectus Supplement and Prospectus for Asset-Backed Securities Issued by Chase Credit Card Owner Trust 1999-3, Sep. 23, 1999 Rule 424(b)(2) SEC Filing.
Credit Suisse First Boston Capital LLC et al., Prospectus Supplement to Prospectus Dated Oct. 12, 1999 re Commercial Mortgage Pass-Through Certificates, Series 2000-C1 by Credit Suisse First Boston Mortgage Securities Corp., Jul. 27, 2000 Rule 424(b)(5) SEC Filing.
Capital Auto Receivables INC., Prospectus Supplement to Prospectus Dated Apr. 8, 1997 for Asset-Backed Securities by GMAC 1997-A Grantor Trust, Apr. 11, 1997 Rule 424(b)(5) SEC Filing.
Key Bank USA National Association, Prospectus Supplement and Prospectus Dated Jun. 9, 2000 for Floating Rate Asset-Backed Notes by Keycorp Student Loan Trust 2000-A, Jun. 13, 2000 Rule 424(b)(5) SEC Filing.
Intermediate Accounting, 10th Ed., "Depreciation, Impairments, and Depletion," pp. 549-554 & "Accounting for Leases," pp. 1189, 1197, 1209-1214, Keiso et al. Eds., 2001 John Wiley & Sons, Inc.
The Handbook of Fixed Income Securities, 5th Ed., "Auto-Loan-Backed Securities," pp. 625-641, Frank J. Fabozzi Ed., 1997 McGraw-Hill.
World Omni 1994-A Automobile Lease Securitization Trust, Amendment No. 3 to Form S-1, Registration No. 33-76448 Securities and Exchange Commission, Aug. 5, 1994.
Astorina et al., "Under the Hood: Automobile Lease ABS Uncovered," Fitch Ratings, Jun. 14, 2000.
Gupta et al., "Rating U.S. Auto Lease-Backed Securitizations: An Update," Fitch Ratings, Jan. 16, 2007.
Hurd, Rodney W., "New Portfolio Strategies for Lessors," Equipment Leasing Today, vol. 12, Issue 2, Feb. 2000.
Kravitt Jason, "Introduction to Securitization," 1998 <<http://www.securitization.net/knowledge/transactions/introduction.asp>>Downloaded Feb. 8, 2012.
Kravitt et al., "Overcoming the Legal Barriers to Auto Lease Securitization," Financing Auto Receivables/AIC Conference, May 1, 1995.
Litwin et al., "New Developments In Equipment and Auto Lease Financing: Securitization, Leveraged Leasing and Titling Trusts," (C) 2000 Aspen Law & Business, Table of Contents, Introduction, Section 1.
Strumeyer et al., "Ch. 15 Asset-Backed Securities," Investing In Fixed Income Securities: Understanding the Bond Market, (C) 2005 John Wiley & Sons, Inc.
Civil Docket for Case #6:10-CV-01373-JA-KRS; Digitech Information Systems, Inc. v. BMW Auto Leasing, LLC et al.; U.S. District Court for the Middle District of Florida (Orlando).
*Digitech Information Systems, Inc.* v. *BMW Auto Leasing, LLC et al.*; Case #6:10-CV-01373-Orl-28KRS; Order Granting Defendant's Motion for Summary Judgment, Mar. 30, 2012.
*Digitech Information Systems, Inc.* v. *BMW Auto Leasing, LLC et al.*; Case #6:10-CV-01373-Orl-28KRS; Judgment in favor of BMW Financial Services NA, LLC, Apr. 4, 2012.
*Digitech Information Systems, Inc.* v. *BMW Auto Leasing, LLC et al.*; Case #6:10-CV-01373-Orl-28KRS; Motion for Reconsideration of Order, May 2, 2012.
*Digitech Information Systems, Inc.* v. *BMW Auto Leasing, LLC et al.*; Case #6:10-CV-01373-Orl-28KRS; Notice of Appeal as to Orders and Judgment, May 2, 2012.
*CLS Bank International et al.* v. *Alice Corporation PTY. LTD.*, No. 07-CV-0974 (Fed. Cir. Jul. 9, 2012).
*Digitech Information Systems, Inc.* v. *BMW Auto Leasing, LLC et al.*; Case #6:10-CV-01373-JA-KRS; Response in Opposition to Plaintiff's Motion for Reconsideration filed by BMW Financial Services NA, LLC, May 23, 2012.
*Digitech Information Systems, Inc.* v. *BMW Auto Leasing, LLC et al.*; Case #6:10-CV-01373-JA-KRS; Reply to Response to Motion for Reconsideration in Further Support of Motion filed by Digitech Information Systems, Inc., Jun. 6, 2012.
*Digitech Information Systems, Inc.* v. *BMW Auto Leasing, LLC et al.*; Case #6:10-CV-01373-JA-KRS; Order of US Court of Appeals for the Federal Circuit: deactivating Notice of appeal effective Jun. 25, 2012, Jun. 28, 2012.
*Digitech Information Systems, Inc.* v. *BMW Auto Leasing, LLC et al.*; Case #6:10-CV-01373-JA-KRS; Notice of Supplemental Authority by Digitech Information Systems, Inc. in Support of Plaintiff's Motion for Reconsideration, Jul. 11, 2012.

* cited by examiner

Collect Broker Entry Variables

Collect Buyer Entry Variables

Risk Mitigation: Acquisition Selection Process

Risk Mitigation: Check Length of Lease

Selection Optimization

METHOD OF MANAGING FINANCIAL INSTRUMENTS, EQUIPMENT LEASE DERIVATIVES AND OTHER COLLATERAL INSTRUMENTS, DATA ARCHITECTURE, APPLICATION AND PROCESS PROGRAM

This application is a continuation of U.S. Ser. No. 10/475,372, filed Mar. 22, 2004 now U.S. Pat. No. 7,739,180, now allowed, which is the national stage of PCT/US02/19424 filed Jun. 17, 2002, which claims priority of U.S. Application No. 60/299,367, filed Jun. 19, 2001, the entire contents of which are hereby incorporated herein by reference into the application.

BACKGROUND OF THE INVENTION

This invention relates generally to financial instruments. More particularly, this invention relates to a method and computer-implemented process for creating lease backed financial instrument derivatives yielding higher than market returns.

Investment vehicles such as venture capital funds have certain risks. Venture Capital generally refers to the business of financing new business undertakings, usually high risk, in the hopes of reaping large rewards if the new business is successful. In a typical scenario, an inventor or group with a new idea will ask a venture capital fund to give them money to start a business built around the new idea. The financial return of the venture capital fund may be large, or in many cases the investment can be a total loss.

Due to the high-risk high-reward nature of such investments, the amount of investment capital available to fund such investments is very limited as investors are concerned about losing their investment. This new methodology is directed at solving the problem so investors can put their principal into higher risk investments like venture capital but know that their principal investment has been secured. This method, would minimize the risk of losses in failed businesses, and would permit investors to continue to finance worthy enterprises without concern about the security of their original principal.

As an example, consider a typical Venture Capital fund with a 10 year life that has raised $100 million to invest in start-up companies. Out of this funds, 2.5% per year for 10 years or $25 million goes for management fees and is not invested, and another 10% is then set aside for reserves, leaving 65% or $65 million that is actually invested in start-up companies. If this $65 million is invested over 5 years, it results in $13 million or 13% per year of the starting capital being invested over 5 years. Now, if the fund does well and averages 5 times return on invested capital, the $100 million fund can generate a 10 year return of $13 million×5 years×5 times=$325 million. However, if the fund does badly as in the case of several funds that invested in Internet start-ups, the investors can lose the entire $100 million resulting in a 100% loss.

With the secured fund methodology according to the present invention we take a different approach. From the $100 million in the fund, 10% also goes into a reserve but the balance $90 million is first invested into equipment leases yielding 15% per year or $13.5 million/year. From this, $2.5 million/year is again paid as management fees and the balance of $11.0 million/year is invested over 10 years. Now, if the fund does well and generates the same five times return on invested capital as the conventional Venture Capital fund, the cash flow invested would generate a return of $11 million×10 years×5 times=$550 million. In addition, in the 10th year, the investors get back their investment of $100 million as the leases mature regardless of the performance of the invested cash flow.

So in the first case if the fund does well, with the same $100 million invested in a Venture Capital fund, with the conventional fund the investors would receive back $325 million versus $650 million for the secured fund according to the present invention. This is double the cash return that the conventional fund offers.

However, if the fund does badly and all the investments are lost, in the worst case the conventional fund investors get back nothing. However, with the secured fund model, the investors still get their principal back as the leases mature in the 10th year.

This is why this new two-tier investment structure according to the present invention is so attractive. It essentially enables investors to get high returns in capital investments without the high risk associated with conventional investments available today.

Even if an investor puts money in an investment vehicle such as private equity fund, stock mutual fund or an individual stock, the investor runs the risk of loss of principal since the principal is not secured. If the fund goes down in value, the investor loses money and can lose the entire principal. As a result many investors have suffered huge losses in mutual funds and stock investments in the recent fall of the NASDAQ from over 5,000 to under 1,600.

The present invention is directed at solving the problem of securing the investor's capital so that an investor can make money when the stock goes up and secures the return of principal if the stock goes down. An investor in a secured mutual fund using this two tier approach receives their principal back even if the NASDAQ drops in price because their principal is not at risk.

Furthermore, investors are finding that yields on safe fixed income investments are very low. Bank CD's are yielding 2-3% per year. Investment grade bonds are yielding 2-6% per year and US government Treasuries are yielding 2-5% per year.

This invention is further directed at solving the problem of allowing investors to obtain yields that are 15% per year or higher and secured by investment grade collateral.

Many start-up businesses have received millions of dollars of investor capital that has been spent on starting the business with no revenue coming in. This appears as a net operating loss on the balance sheet of the company but has little value to the start-up until it becomes profitable.

The present invention is further directed at solving the problem of being able to use these losses as an asset by the start-up company.

In theory the concept of a two-tier investment structure is not new. An investor can take their money, put it into corporate bonds with a 10-year life, get a 5% return and invest the interest earned in venture capital or stocks. The problem is that this conventional return on capital on A, AA or AAA rated corporate bonds is still around 3-5% giving little cash returns for investment as a two-tier structure. Hence, the two-tier structure cannot work in today's environment due to the low returns. Yet if the investor tries to get higher returns and puts the capital directly into venture capital or stock as is being done at present, there is the risk of loss of capital. In fact, investors have lost billions of dollars seeking high returns while the NASDAQ has fallen from over 5,000 to under 1,600 today. Using the methodology proposed here could have saved these companies billions of dollars.

The reason that no one has used equipment leases before, as part of a two-tier investment structure, is because of problems in finding high yielding value in the marketplace. Furthermore, there is no NASDAQ type exchange for equipment leases as there is for stocks or bonds, due to the lack of uniform evaluation methodology and exchange type mechanism to trade equipment leases. New equipment leases typically yield only 4% to 8% per year rates of return. The average length of a lease is typically 1 to 50 years depending upon the type of equipment from cars through railcars, aircraft and barges. Hence, using equipment leases does not seem to be an obvious solution to this problem.

It does become a solution when one analyzes equipment leases in great detail and break them up into their derivative elements. The opportunity is created when one becomes aware that the fair market value of the leased equipment decreases over time at different rates depending upon the type of equipment but the lease payments typically remain fixed or decline at different intervals over the length of the lease. As a result, if these residual leases, which may be several years old, are purchased in the secondary market and held for a predetermined optimum time period taking the lease payments, fair market values at the time of purchase and sale and other related facts into consideration, then it is possible to use these residual leases to create lease derivatives to obtain cash flows yielding 15% per year or higher.

Furthermore, the mathematical models being used can be applied uniformly through numerous categories of (eases and the evaluation criteria and formulas used to establish rates of return for evaluating leases can also be used as the fundamental mechanism for a NASDAQ type trading exchange in which buyers and sellers can trade equipment leases.

Due to the complexity of evaluating hundreds and thousands of leases to determine specific leases to be bought and sold, establishing buying and selling parameters, and then using these derivatives to construct a portfolio, we have proposed our new algorithm and methodology to be computer implemented.

SUMMARY OF THE INVENTION

It is an object of the present invention to provide a method and an apparatus for selecting lease backed financial instrument derivatives yielding higher than market returns.

It is another object of the present invention to use the selected leases to form a two tier investment structure.

It is a further object of the present invention to apply the two tier investment structure to a venture capital environment.

It is a further object of the present invention to apply the two tier investment structure to a private and/or public equity environment including stock mutual funds.

It is a further object of the present invention to apply the two tier investment structure to a debt instrument environment including bond funds.

It is a further object of the present invention to use the uniform evaluation methodology and basic mathematical formulas and algorithms in this patent to create a NASDAQ type trading exchange to trade equipment leases as there is for stock trading.

It is a further object of the present invention to apply the two tier investment structure to create new financial instrument derivatives for securing investments in venture capital, private equity, mutual funds and other types of funds through the use of a computer system that embodies the process.

These and other objects of the present invention will become apparent to those skilled in the art upon the following description of the invention.

According to one aspect of the present invention a method for selecting leases to optimize an investment portfolio is provided including the steps of receiving data concerning an equipment purchase price, an equipment sale price, a number of units, a lease purchase price, a life of lease, a lease acquisition fee, an accelerated depreciation of change, and a yearly payment; calculating a total purchase price by adding the lease purchase price to the lease acquisition fee; calculating an accelerated depreciation result by multiplying the individual purchase price by the number of units; calculating a rate of return by subtracting from the yearly payment the total purchase price and the accelerated depreciation result and dividing by the lease purchase price; and selecting a lease based on the rate of return being greater or equal to a predetermined value.

According to another aspect of the present invention an apparatus for facilitating a selection of leases to optimize an investment portfolio is provided including a storage device; and a processor connected to the storage device, the storage device storing a program for controlling the processor, wherein the processor operates with the program for receiving data concerning an equipment purchase price, an equipment sale price, a number of units, a lease purchase price, a life of lease, a lease acquisition fee, an accelerated depreciation of change, and a yearly payment; calculating a total purchase price by adding the lease purchase price to the lease acquisition fee; calculating an accelerated depreciation result by multiplying the individual purchase price by the number of units; calculating a rate of return by subtracting from the yearly payment the total purchase price and the accelerated depreciation result and dividing by the lease purchase price; and selecting a lease based on the rate of return being greater or equal to a predetermined value.

DETAILED DESCRIPTION OF THE INVENTION

Figure 1:
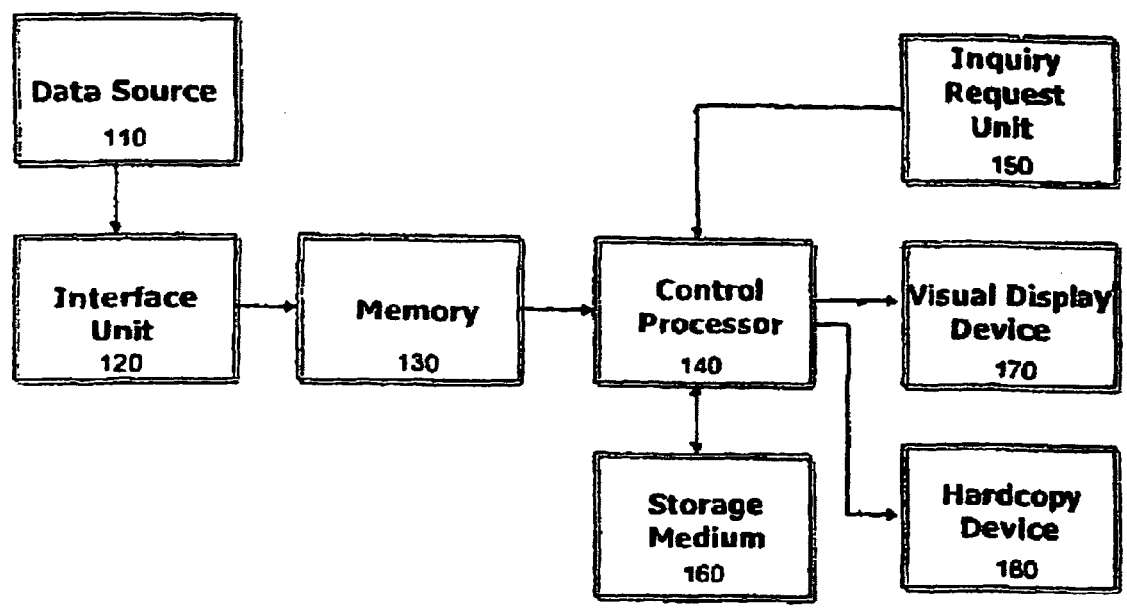
FIG. 1 is a block diagram illustrating the overall computer system used in the present invention.

The present invention is a business method process which creates derivative investment vehicles from residual equipment leases and other collateral instruments by means of an agent data application and processing program which breaks down the leases into derivatives strips of principal and income in tandem with given investment and business variables. These derivatives can then be used to create secured venture capital, private equity, public equity and debt instrument funds where the investors may obtain above market yields with up to 100% security of their invested capital.

The following variables will be used in the description of the present invention and are defined herein:

| | |
|---|---|
| EPP = | Individual Equipment Purchase Price ($) ** |
| EEPP = | Individual Equipment Sale Price ** |
| NU = | Number of Units ** |
| LPP = | Lease Purchase Price ($)** |
| TP = | Table Pointer (based on 1 to Length of Lease) |
| YP (TP) = | Yearly Payment ** |
| LLM = | Life of Lease in Months ** |
| LMFD% = | Lease Management Fees (%)** |
| LAF$ = | Lease Acquisition Fees ($)** |
| LAFD% = | Default Lease Acquisition Fee (%)** |
| AD% = | Accelerated Depreciation % of Change |
| GI = | Investment Grade Rating of lease owner** |
| TE = | Type of equipment being leased** |
| TI = | Type of investment vehicle, for example, Venture capital, Private equity, public equity or debt instrument** |
| MRR% = | Minimum Rate of Return *** |
| MGI = | Minimum Grade of Investment*** |
| MLOL = | Minimum Length of Lease *** |
| PTE = | Preferred Type of Equipment *** |
| ALP$ = | Amount of Leases to Purchase *** |
| TPP = | Total Purchase Price |
| FMVE = | Fair Market Value at End of Lease |
| REOL = | Residual at End of Lease |
| LOL = | Length of lease in years |
| SLD = | Straight Line Depreciation |
| LAF% = | Lease Acquisition Fees (%) |
| ACFY = | Annual Pretax Cash Flow Yield |
| PPM = | Payments Per Month |
| PPY = | Payments Per year |
| FMVS (TP) = | Straight Line Depreciation Results |
| FMVA (TP) = | Accelerated Depreciation Results |
| RR (TP) = | Rate of return per year for different Lengths of Lease to determine best holding period for leases being considered for purchased to maximize rate of return percentage. |
| RRT = | Rate of Return Total is an accumulator for all years calculated by the RR(TP) formula. For each year calculated the results are added to this variable. |
| RRA = | Rate of Return Average for all years calculated. |

** These formula variables are usually provided by a Broker or lease seller.
*** These variables are optional and are usually provided by the Buyer for the selection of a lease. If the variables are not provided, the present invention uses default tables to select the leases.

The present invention describes a unique business method and computer-implemented process to achieve the above-noted secured type Investment objectives.

The method works as follows. Instead of making a direct investment into a business seeking capital, the investor engages in a two-tier investment strategy by first using the principal to acquire or finance acquisition by a buyer or fund of collateral such as an equipment lease.

Further, the investor invests or acquires rights in seasoned collateral instruments at a discount. The collateral instrument can be equipment leases, bonds, Treasury bills, preferred stock, asset backed securities, securities credit card debt, mortgages—essentially any financial instrument that has both principal and interest components with low risk and high cash flow. After acquiring this low risk collateral the cash flow and/or interest from the collateral instrument is then invested in the start-up businesses or a fund by means of loan and/or equity investment. The principal of the collateral acquired is not invested in the business and remains secure. If the investor assigns its rights to the collateral, it finances the purchase of the collateral by the business which becomes the owner of the collateral and which repays the loan and interest and retains any excess collateral income for its capital needs.

In theory, investors can achieve similar results by using existing techniques such as investing their principal and in real estate such as an apartment building and then using the rent from the real estate transaction to invest in venture capital. In practice, this does not work because the rent payments from real estate are usually barely enough to pay the operating costs of the building leaving little or no cash flow available for investment. This is also the case for most well known high yield debt investments like 10 year US Government Treasury bills that are yielding only 4-5% per year.

Our research has shown that it is virtually impossible for investors to obtain yields over market rates currently at 4-6% per year with their principal being secured by investment grade paper.

The present invention provides the unique ability to identify, select and analyze existing financial instruments, subject them to the novel mathematical models described herein, and using various criteria, mix, match, assess and combine with other securities to come forth with a new derivative financial instrument. This process requires searching and matching through thousands of instruments, hence requiring the benefit of a computer implemented process.

As an example, the equipment-leasing marketplace in the US is $280 billion/year. This represents millions of leases yearly. Most new lease paper yields about 2-7% per year and many leases are offered for sale and resale. There is no NASDAQ type exchange for leases in the US and brokers typically offer leases to investors on a piecemeal basis, as every lease is different. The method according to the present invention allows the user to enter all the information about the leases into the database, assess it against the criteria using the pre-defined formulas to help identify, select and acquire the appropriate leases to go into the derivatives, which would then be structured. The selection methodology and computer program can further be extended to create an equipment lease exchange similar to the NASDAQ.

For example, 2,000 different leases a week for sale can be received by 10 brokers from 2000 individual owners and businesses with varying fair market values at the end of the lease term. This can consist of 700 different car leases with 1 to 4 year lives yielding 2-7% per year, 300 aircraft leases with 2 to 20 year lives yielding 3-15% per year, and 1,000 railcar leases with 0 to 50 year lives with payments of $600 per month per car with unknown yields. The process will take all this information, enter it into the database; apply the formulas, analyze it and provide selections for acquisition. The results may be to acquire 15 residual railcar leases in which the equipment is owned by, an AA investment grade company, which are 20 years old with a 50 year life, on which the fair market value today is $30,000 per car and hold them for a maximum of ten years with a projected resale value of $27,000 per railcar and a resultant lease yield of 17.3% per year over the life of the holding period.

These leases may then be combined with hundreds of other leases to create financial instrument derivatives forming the basis of a new $100 million secured venture capital fund, for example, with a cash flow available for investment of 15% per year or $15.0 million. The fund would then invest only the cash flow from these leases in start-ups using various criteria so that even if the start-up is lost, the investor's principal is secured by the underlying railcar leases and equipment and is repaid at the maturity of the leases.

The cash flow from the collateral instrument is treated as income, not equity, for the business, enhancing a start-up business' financial statement. Hence the structure is of particular benefit for companies with accrued net operating fosses.

Figure 11:
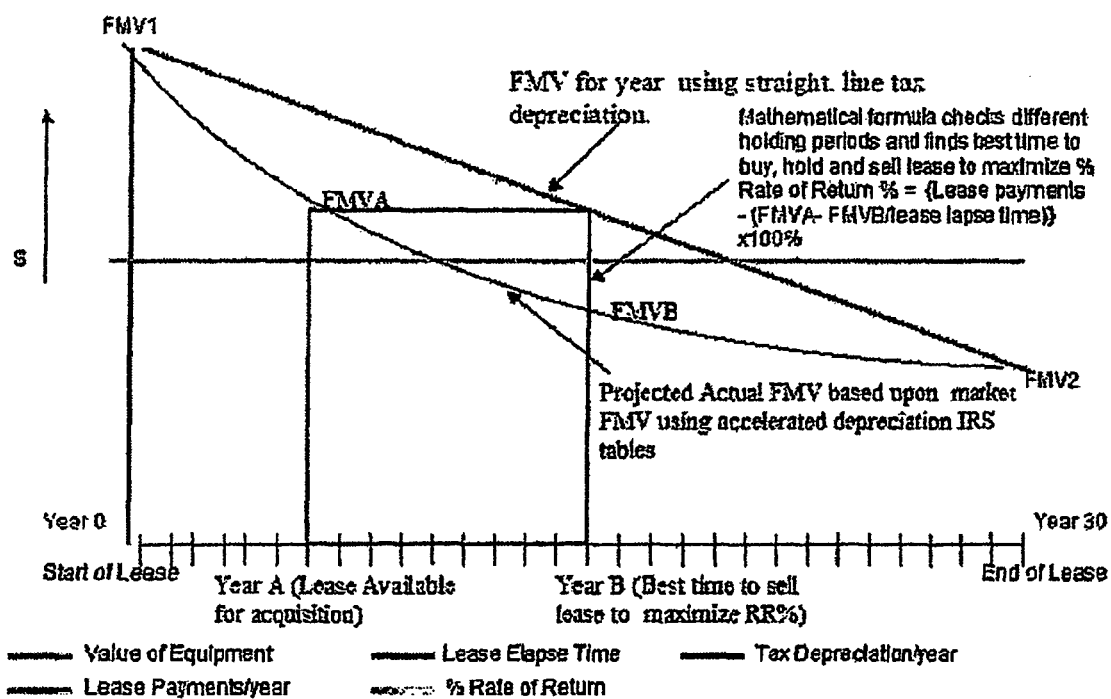
FIG. 11 is a graphic that illustrates the typical changes in fair market values for equipment leases.

The graphic shown in FIG. 11 illustrates typical changes in fair market values for equipment leases. FMV1 represents the purchase price of the equipment at the start of the lease. Year A represents the year when the lease is offered for sale by the buyer at FMVA $ with the remaining life of 30 years. The mathematical algorithm according to the present invention checks different holding periods and finds the best time to buy, hold, and sell the lease to maximize the rate of return.

The present invention creates new financial instrument derivatives for securing investments in venture capital, private equity, mutual funds and other types of funds through the use of a computer system that embodies a process of and method for acquisition, contract closing, contract administration and liquidation which includes targeting of financial instruments and depreciated collateral derivatives. It includes the data architecture, application, processes, and methodology for acquiring, managing and distributing the financial instruments.

It creates derivative investment vehicles from collateral based upon defined criteria for mitigating risks (tax, structure, operator, collateral, residual values) by means of an agent data application and group of processing programs which breaks down the collateral into derivatives strips of principal and income in tandem with given investment and business variables.

It creates the process whereby financing can specifically be provided to business borrowers whose balance sheets have net operating losses or any risk prone investment using the identification, analysis and selection methodology and process to acquire collateral instruments to support the risk.

The method according to the present invention is used to provide a secured investment vehicle to organizations investing in private or public companies or any high-risk venture.

The present invention is now described more fully hereinafter with reference to the accompanying drawings, in which preferred embodiments of the invention are shown. This invention may, however, be embodied in many different forms and should not be construed as limited to the embodiments set forth herein rather, these embodiments are provided so that this disclosure will be thorough and complete, and will fully convey the scope of the invention to those skilled in the art. Each drawn object contains numbers to assist with the explanations of the workflow and like elements throughout.

The system architecture of a first embodiment of the apparatus and method of the present invention is illustrated with reference to FIGS. 1 through 3. As shown in FIG. 1, the apparatus of the present invention comprises data sources 110, interface unit 120, memory 130, control processor 140, Inquiry request unit 150, storage medium 160, visual display device 170, and hardcopy device 180 (collectively referred as "physical hardware components").

Using the above components, the present invention provides a method and apparatus to collect data from internal and external sources, which are required for submission to the acquisition decision process, and then used to identify potential investment candidates.

A conventional personal computer or computer workstation with sufficient memory and processing capability may be used as the data processor 140. The data processor 140 must be capable of high volume transaction processing, performing a significant number of mathematical calculations in processing communications and database searches. This processor can have a 32-bit architecture, for example.

Figure 2:
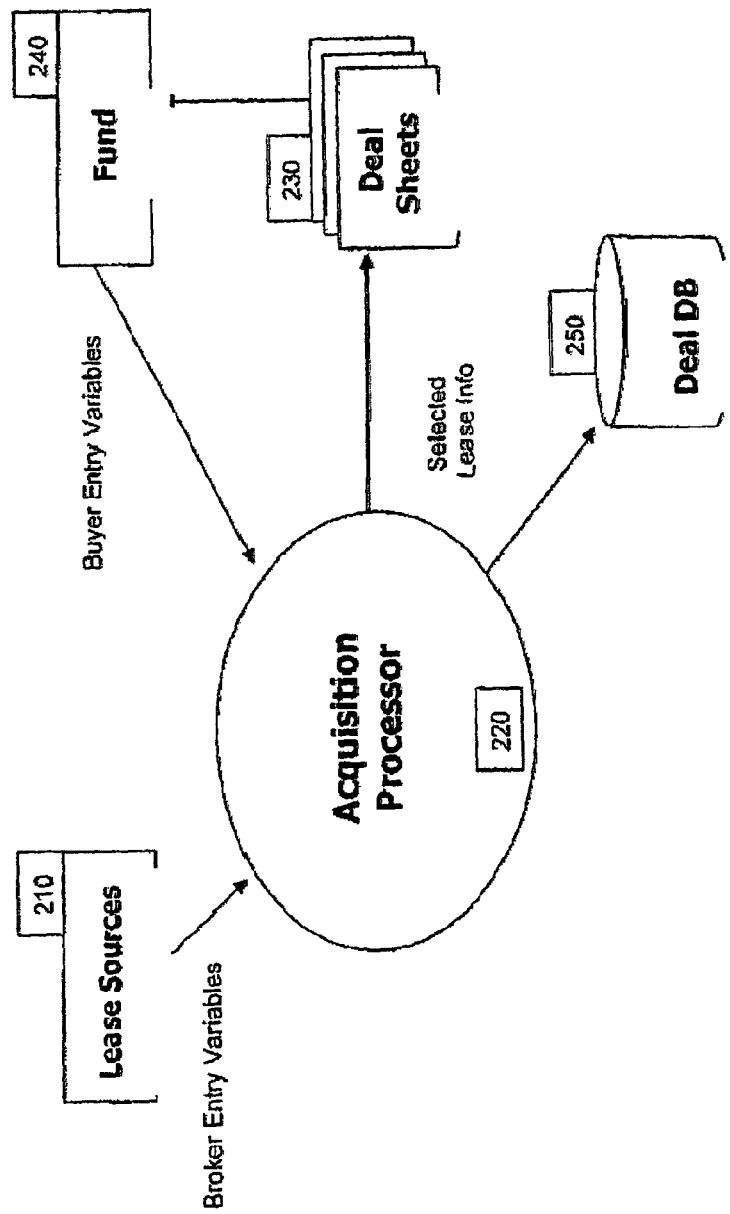
FIG. 2 is a dataflow diagram illustrating the core processes, inputs, and outputs of the processes in accordance with the principles of the invention organized and applied within the computer system components.

Now turning to FIG. 2, the Core Process Inputs & Outputs are described. The acquisition processor 220 comprises two sub-components supporting the transfer and storage of data, calculation for the selection process, risk evaluation and selection optimizer attendant to the method according to the present invention. The acquisition processor 220 will support various types of data entry vehicles, such as web-based manual entry, local manual entry and a digital file entry. The acquisition processor will collect the data from lease sources 210, as shown in detail in FIG. 4, and the fund sources 240, as shown in detail in FIG. 10, apply the formulas to the collected data, store the data in the deal database 250 and produce deal sheets 230 representing leases meeting either a default selection criteria or a buyer entered selection criteria, as shown in detail in FIG. 10, which is passed along to fund management organizations 240 using the deal sheets 230.

Figure 3:
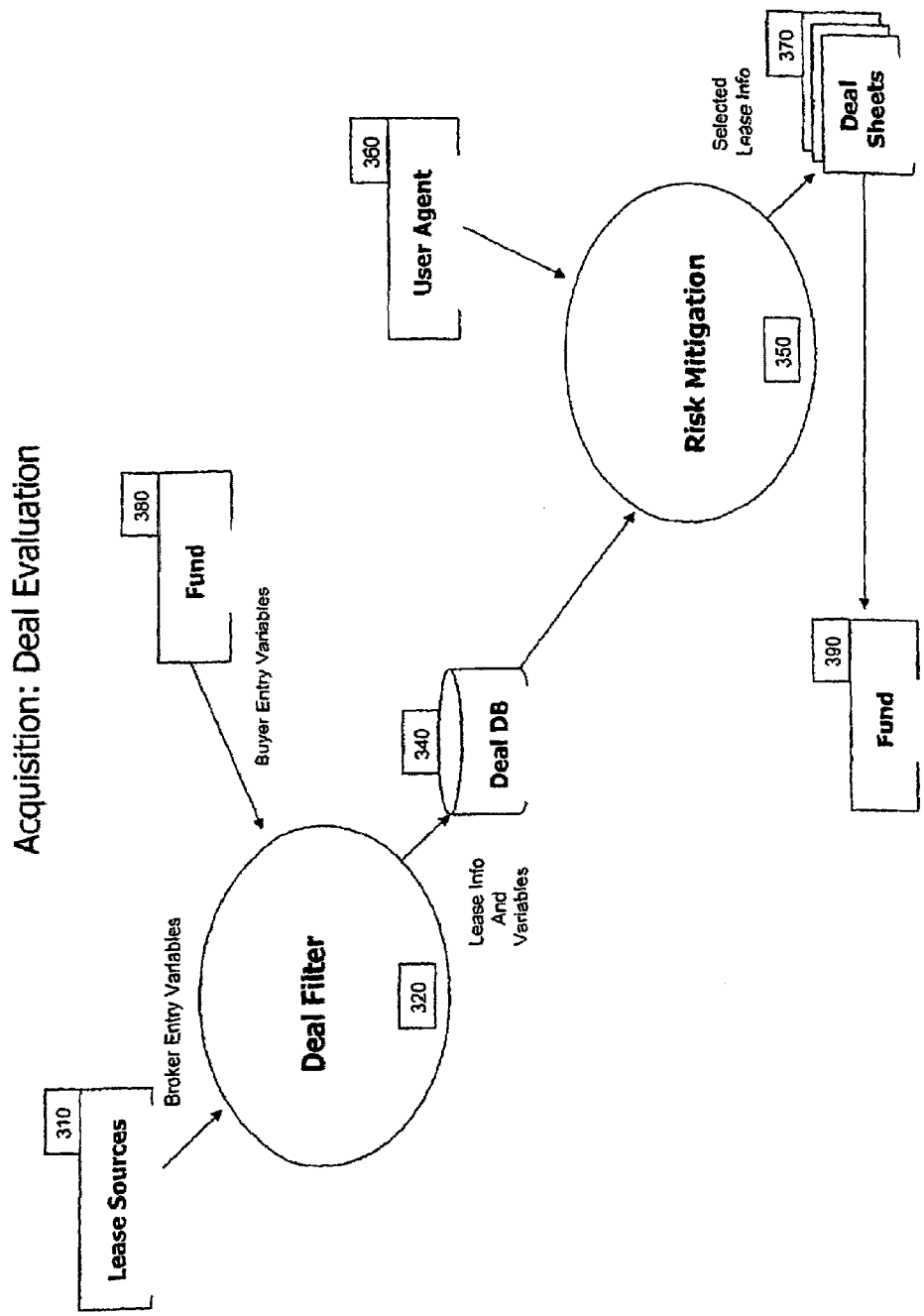
FIG. 3 is a dataflow diagram illustrating the acquisition process, its inputs, and outputs.
Figure 10:
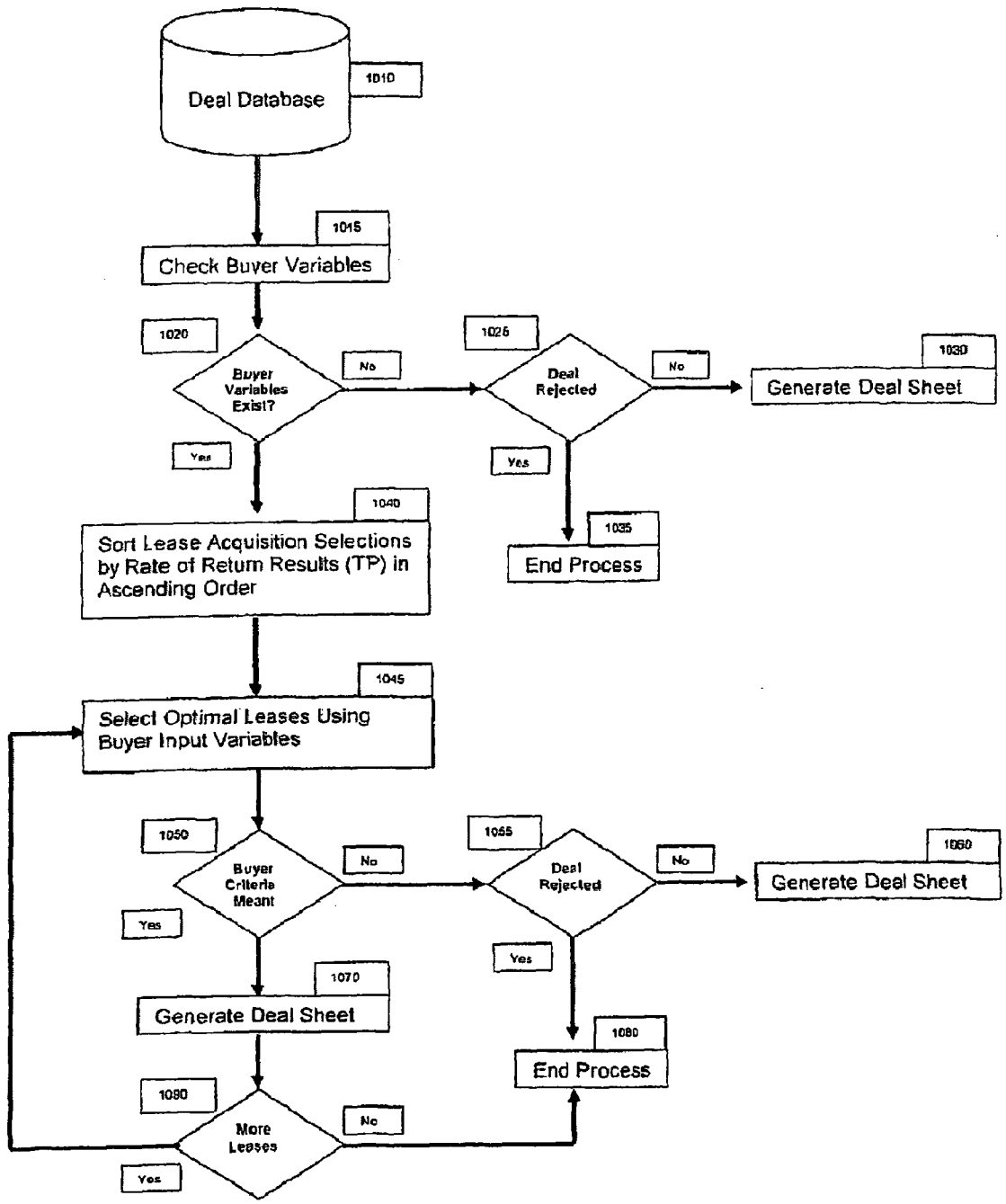
FIG. 10 is a flowchart illustrating the selection optimization process which either uses the buyers input variables or the default tables according to the present invention to generate the deal sheet, which represents an offer to establish a portfolio or to add to an existing portfolio.

FIG. 3 represents the two sub-components of the acquisition processor 220 of in FIG. 2. The deal filter 320, which collects the data, stores the data and applies the formulas to set up the selection process, and risk mitigation 350, which uses the default Tables 1, or 2, or 3, or 4, and 5 to complete the selection process or the buyer entered variables, as shown in FIG. 10, to produce a deal sheet 370. The default Tables 1-4 are presented below.

The lease sources 310 are the same as the lease sources 210 shown in FIG. 2, the deal database 340 is the same as the deal database 250 of FIG. 2, the funds 380 and 390 are the same as the fund 240 of FIG. 2, and the deal sheets 370 are the same as the deal sheets 230 of FIG. 2. The user agent 360 is the buyer, as described in detail in FIG. 10.

The data is input through the interface unit 120 of FIG. 1. In an exemplary embodiment it is a conventional personal computer having an input device, such as a keyboard, mouse, or conventional voice recognition software package, a display device, such as a video monitor, a processing device such as a CPU, and a network interface such as a modem. These devices interface with the control processor 140 of FIG. 1. Alternatively, the lease source 310 may also be voice mail systems, or other electronic or voice communications systems. Devices such as fax machines or pagers are also suitable interface devices.

The data storage medium 160 of FIG. 1 is a conventional magnetic-based hard disk storage unit, for example, such as those manufactured by various peripheral companies. It will contain the deal database 340, which stores the values of Tables 1, 2, 3, 4, and 5 shown below along with other values that define the data sources, the formula algorithms, descriptions of the equipment, terms of the deals and clients licensed to use the invention.

The variables to be used by the novel formula according to the present invention were defined above and include information about the equipment, such as, individual equipment price, end of lease equipment purchase price, numbers of units, the lease purchase price, life of lease in months, default lease acquisition fees percentage, lease acquisition fee dollar amounts, accelerated depreciation percentage of change, and tables containing yearly payments, which represent rental income, type of instrument, type of equipment, grade of investment, minimum rate of return, minimum grade of investment, minimum length of lease, preferred type of equipment and amount of lease to purchase.

The above mentioned data specific to the formulas is the core of the data needed to perform the selection process, however, the supporting data that identifies the sources, identifying characteristics of the deal and terms is collected and stored by the computer application system supporting the invention.

Figure 4:
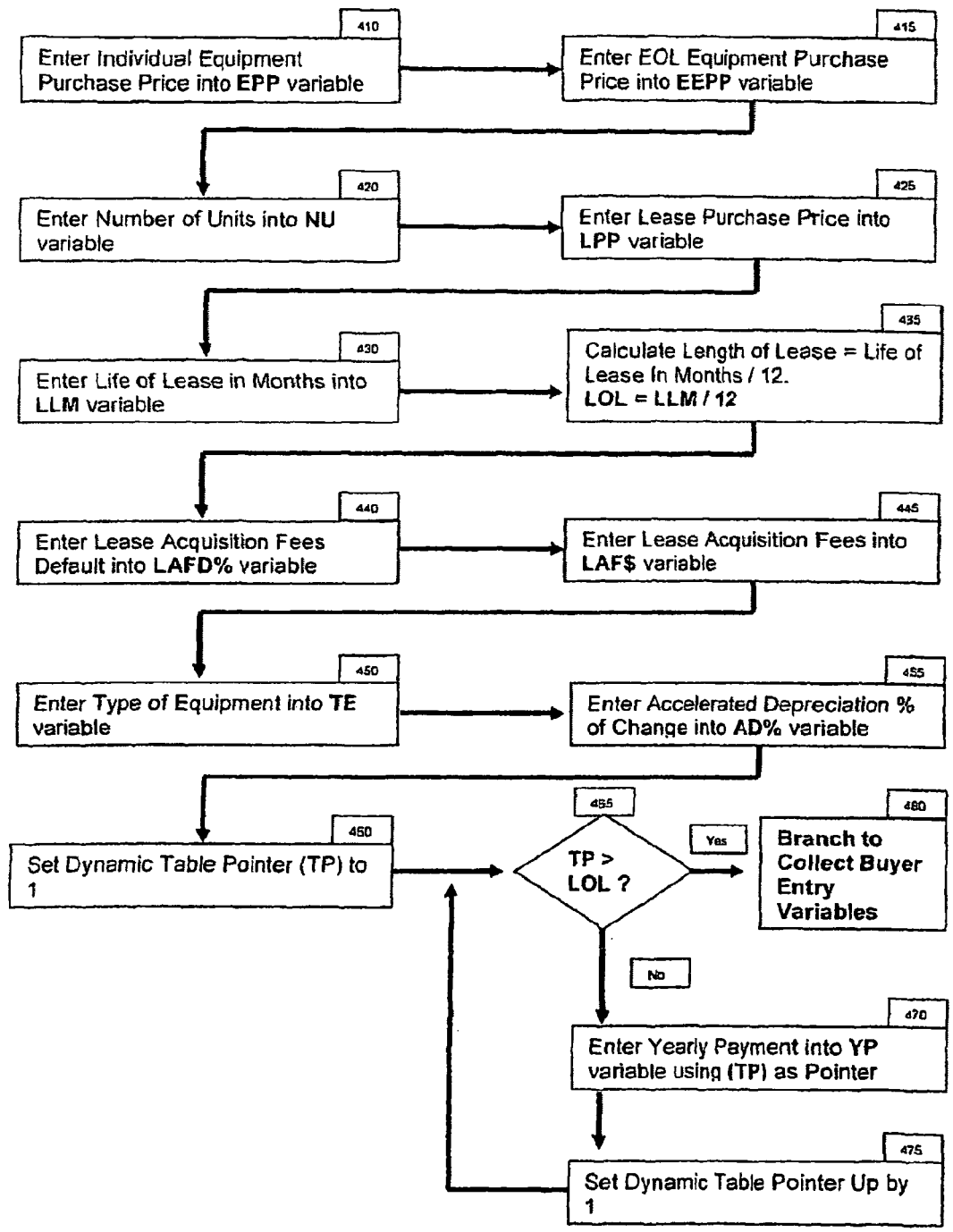
FIG. 4 is a flowchart illustrating the collection of the required formula variables provided typically by a broker, for example, used as input to the algorithms necessary to analyze, identify, and select the leases meeting the criteria for acquisition in accordance with the principles of the invention.

The collection of core variables is illustrated in FIG. 4. This variables are typically entered or provided by a lease broker, FIG. 4 includes the following steps: obtain and store the EPP variable, which represents the individual equipment purchase price, step 410; the EEPP variable, which represents the end of lease individual equipment purchase price, step 415; the NU variable, which represents the number of units, step 420; the LPP variable, which represents lease purchase price, step 425; the LLM variable, which represents the life of the lease stated in months, step 430; the LOL variable which represents the length of lease is calculated by dividing the life of the lease stated in months, the LLM variable, by 12, step 435; the LAFD % variable which is the default lease acquisition fees stated as a percentage, step 440; the LAF$ variable which represents the lease acquisition fees stated in dollars, step 445; the TE variable which represent the type of equipment, 450, and the AD % variable which represents the accelerated depreciation percentage, step 455.

The following data is collected and stored using a dynamic table, which allows the creation of a table using the length of lease variable, LOL, as the parameter to define the number of entries to the table, and once defined, using a table pointer, the TP variable as a counter to determine which yearly payment YP variable cell in the table the data will be entered into. In step 460, the dynamic table pointer, (TP) is set to 1, which represents the first entry in the table, in step 465, the table pointer, (TP) is compared to the length of the lease, LOL variable to determined whether the dynamic table has reached its limit, when the dynamic table reaches its limit, the process will be diverted to branch to the collect buyer entry variables, step 480. If the dynamic table pointer, (TP) has not reached its limit, the broker enters the first years payment YP(TP), step 470, one is added to the dynamic table pointer, (TP), step 475 and the process branches back to the table pointer and length of lease compare step 465 until all entries are completed.

These variables are presented through various presentation mediums, such as, a web-based form, an application program form or a file-processing program. The same logic will apply no matter in which medium the data is collected.

Figure 5:
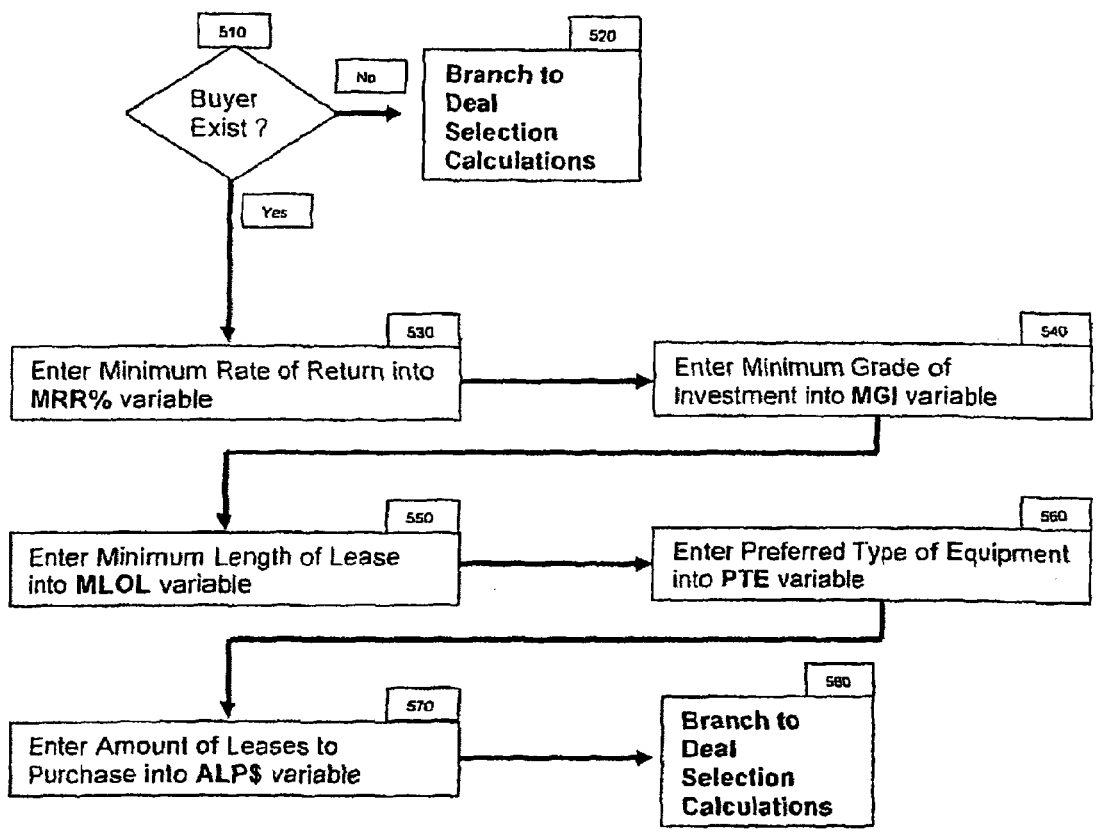
FIG. 5 is a flowchart illustrating the collection of information supplied by a buyer, for example, which states the buyer's desire for specific criteria to be meant in selecting the types of leases to be considered for acquisition.

FIG. 5 represents the data to be collected from a buyer, for example. The buyer may or may not exist or the buyer may wish to use the default variables for the selection process. Step 510 checks to see whether a buyer exists or not. If a buyer does not exist, the process branches to the deal selection calculations defined in step 520 shown in detail in FIG. 6.

If a buyer does exist, the process allows data specific to the buyer's lease selection criteria to be collected, such as, the minimum rate of return variable MRR % in step 530; the minimum grade of investment variable MGI in step 540, the minimum length of lease variable MLOL in step 550; the preferred type of equipment variable PTE in step 560; the amount of lease to be purchased variable ALP$ in step 570; and then branches to the deal selection calculations, in step 580.

The buyer does not have to complete all entries, any combination of data can be entered. When the process encounters empty variables, the default values will be used in place of the buyer variables. For example, if the buyer does not enter minimum rate of return, the present invention will select the highest rate of return that is calculated by the calculated rate of return process.

Figure 6:
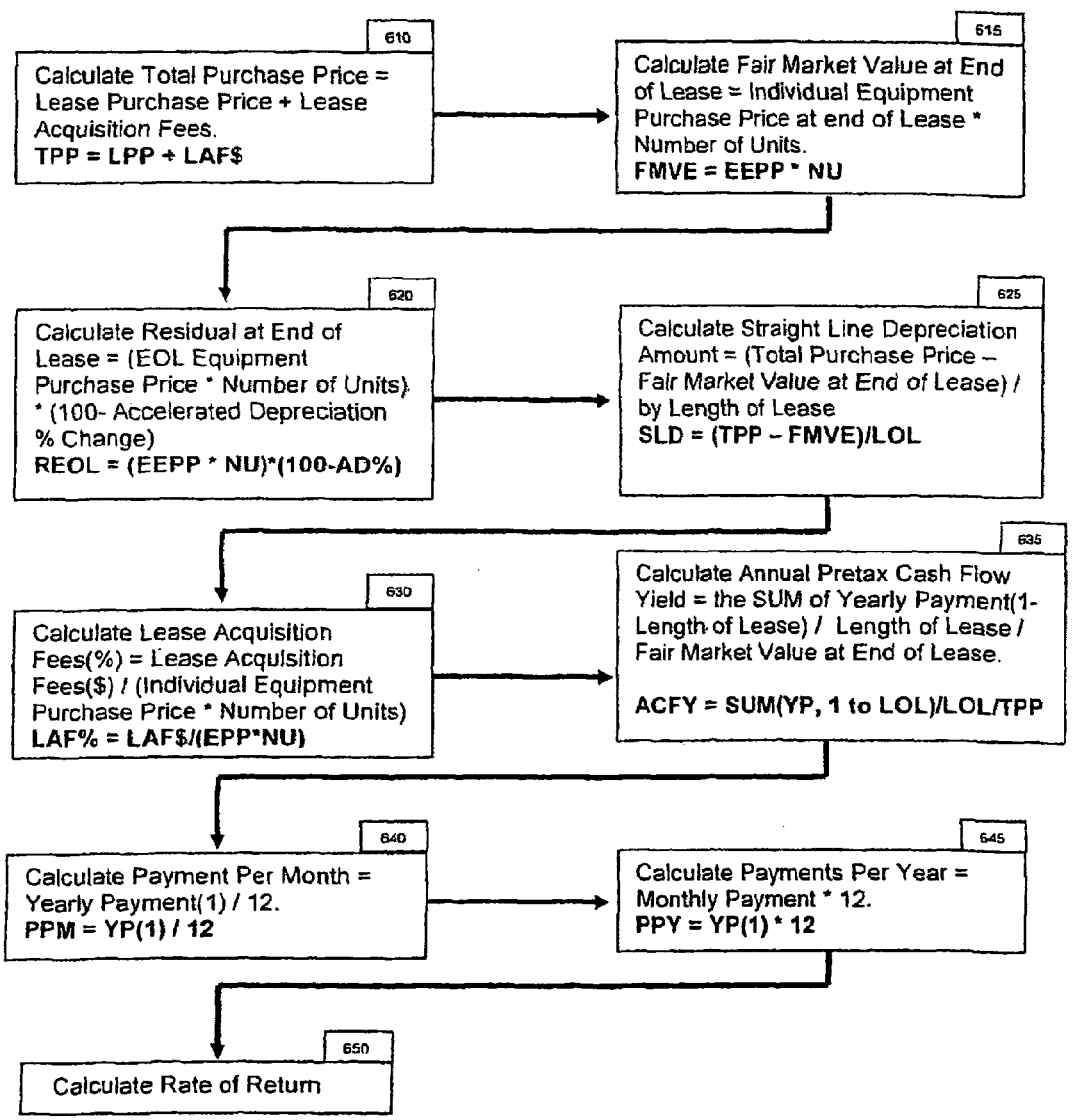
FIG. 6 is a flowchart illustrating the required steps in the formula to obtain the necessary values to select candidate lease instruments.

The data collection steps in FIG. 4 are used to apply the deal selection formula in FIG. 6, which illustrates the required steps for deriving the rate of return variable according to the present invention and according to the present invention and used as input to the risk mitigation process, 350 of FIG. 3. The TPP variable represents the total purchase price and is calculated by adding lease purchase price, LPP, and the lease acquisition fees in dollars LAF$, step 610.

The FMVE variable represents the fair market value at the end of lease and is calculated by multiplying the end of lease equipment purchase price, EEPP, by the number of units, NU, step 615.

The REOL variable represents the residual at the end of lease and is calculated by first multiplying the end of lease equipment purchase price, EEPP, by the number of units, NU, and then subtracting the accelerated depreciation percent of change, AD %, from 100 and using the results to multiply by the first calculations results, step 620.

The next step, 625, calculates the straight line depreciation amount, SLD, by subtracting the fair market value at end of lease, FMVE, from the total purchase price, TPP and then dividing the results by the length of lease, LOL.

The next step, 630, calculates the lease acquisition fees percentage, LAF %, by first multiplying the individual equipment purchase price, EPP, by the number of units, NU, and dividing the results by the individual equipment purchase price dollars, LAF$.

The ACFY variable represents the annual pretax cash flow yield and is calculated by first adding all of the yearly payments YP in the dynamic table, storing the information using the table pointer, TP, to point to the next element to be added and then dividing the results by the length of lease, LOL and then dividing that result by the total purchase price, TPP, in step 635.

The next step, 640 calculates the payment per month, PPM by dividing the first yearly payment by 12. This is for informational purposes and is stored as data. The yearly payments are stored in a dynamic table, accessed by the dynamic table pointer, TP. The table pointer is not used to access to first entry in the table, but rather a hard coded 1 is used in its' place. This process can be altered to accumulate all of the yearly payments and average them based on the length of lease.

The next step, 645 calculates the payments per year, PPY by multiplying the first yearly payment by 12. This is done as a default when the broker enters only one payment per year. This is also used as a default. Once this step is completed, step 650 will branch to calculate the rate of return.

Figure 7:
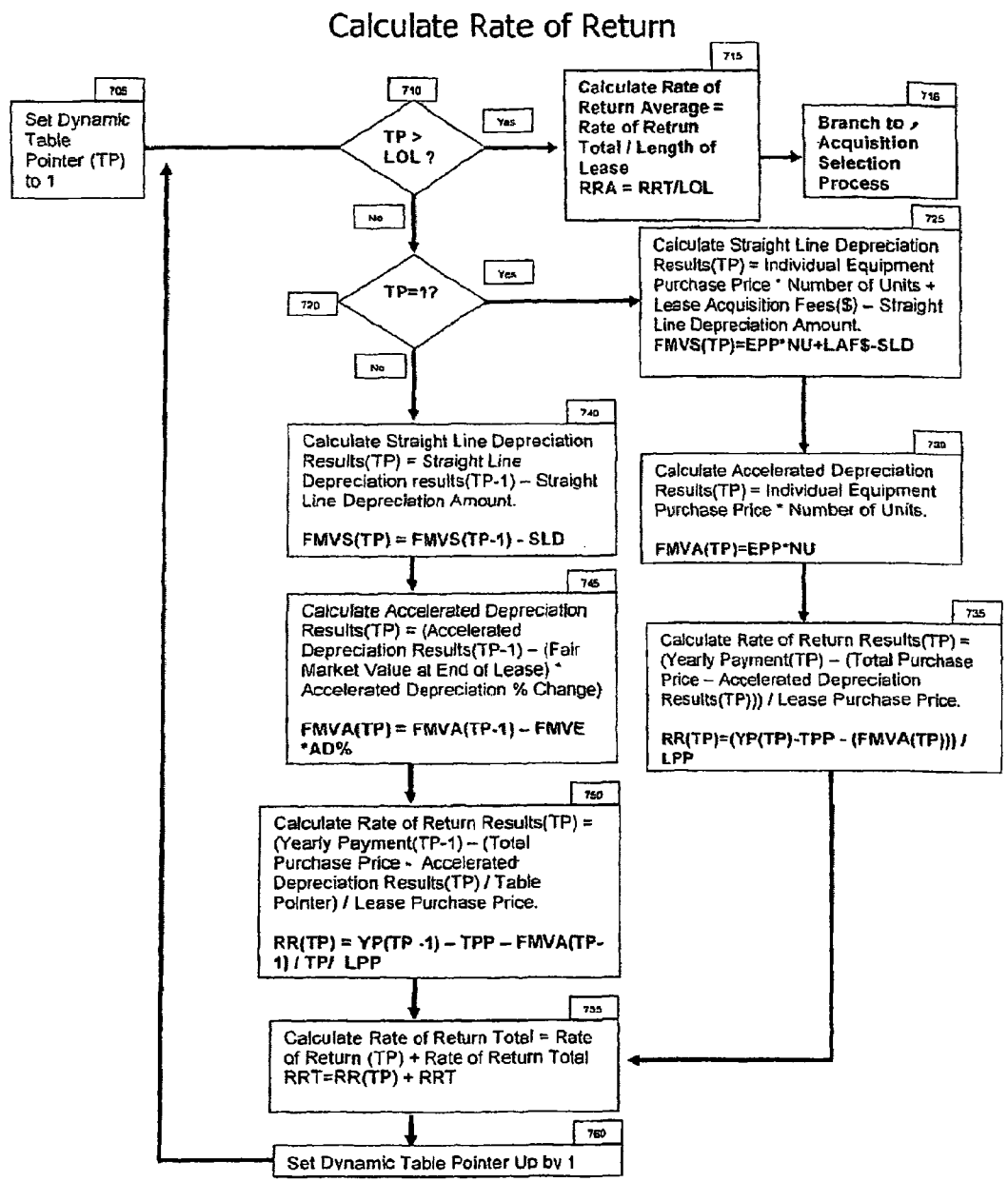
FIG. 7. is a flowchart illustrating the required steps to establish the variables necessary to formulate optimal time periods for determining lease payments, fair market values and their rates of return by creating dynamic tables to store the calculated results of the formulas.

Now turning to FIG. 7, calculating the rate of return involves establishing a dynamic table containing the straight-line depreciation, accelerated depreciation and the rate of return.

The above mentioned data will be collected and stored using a dynamic table, which allows the creation of a table using the length of lease variable, LOL, as the parameter to define the number of entries to the table, and once defined, using a table pointer, the TP variable as a counter to determine which cell in the table will contain the calculated entry. In step 705, the dynamic table pointer, (TP) is set to 1, which represents the first entry in the table, in step 710, the table pointer, (TP) is compared to the length of the lease, LOL variable to determined whether the dynamic table has reached its' limit. When the dynamic table reaches its limit, the process will calculate the Rate of Return Average in step 715, and then be diverted to branch to the acquisitions selection process, shown in FIG. 8, step 716. If the dynamic table pointer, (TP) has not reached its limit, the table pointer, TP will be checked to determine if the value of TP is 1, step 720.

When the value of the table point, TP, is equal to 1, in step 725 is where the straight line depreciation results FMVS, for the first entry in the table, is calculated by multiplying the individual equipment purchase price, EPP, by the number of units, NU, adding the lease acquisition fees dollar amount, LAF$, to the results and subtracting the straight line depreciation amount, SLD from its results. The next step, 730 is where the accelerated depreciation results, FMVA, is calculated by multiplying the individual equipment price, EPP, by the number of units, NU, and storing the results in the first entry of the dynamic table. Step 735 determines the rate of return by using calculated results in the dynamic tables containing the yearly payments and the accelerated depreciation results to calculate the rate of return as follows: the yearly payment, YP(TP) is subtracted from the total purchase price, TPP, with the results being subtracted from accelerated depreciation results, FMVA(TP) and then divided by lease purchase price, LPP. A "1" is then added to the dynamic table pointer, TP, in step 755. Step 755 then branches back to step 710 to perform the comparison again.

When the value of the table point, TP is greater than 1, step 740 is where the straight line depreciation results, FMVS, for the next entry in the table is calculated by subtracting the straight line depreciation amount from the previous straight line deprecation results, FMVS(TP−1). The way this is done is using the table pointer, TP, to point to the next entry and then addressing the previous entry by using a minus 1. This method allows referencing two elements in the dynamic table at the same time.

The next step, 745 is where the accelerated depreciation results, FMVA, are calculated. It uses the same two-element reference as done in step 740. It is calculated by subtracting the accelerated depreciation results, FMVA(TP−1) from the previous accelerated depreciation results, then subtracting the fair market value at end of lease, FMVE, and then multiplying the results by the accelerated depreciation percentage of change, AD %. Step 750 determines the rate of return by using calculated results in the dynamic tables containing the yearly payments and the accelerated depreciation results to calculate the rate of return as follows: the yearly payment, YP(TP−1), which is the previous yearly payment, is subtracted from the total purchase price, TPP with the results being subtracted from previous accelerated depreciation results, FMVA(TP−1) and divided by the table pointer, TP and then divided by lease purchase price, LPP. A "1" is then added to the dynamic table pointer, TP, in step 755. Step 755 then branches back to step 710 to perform the comparison again.

Figure 8:
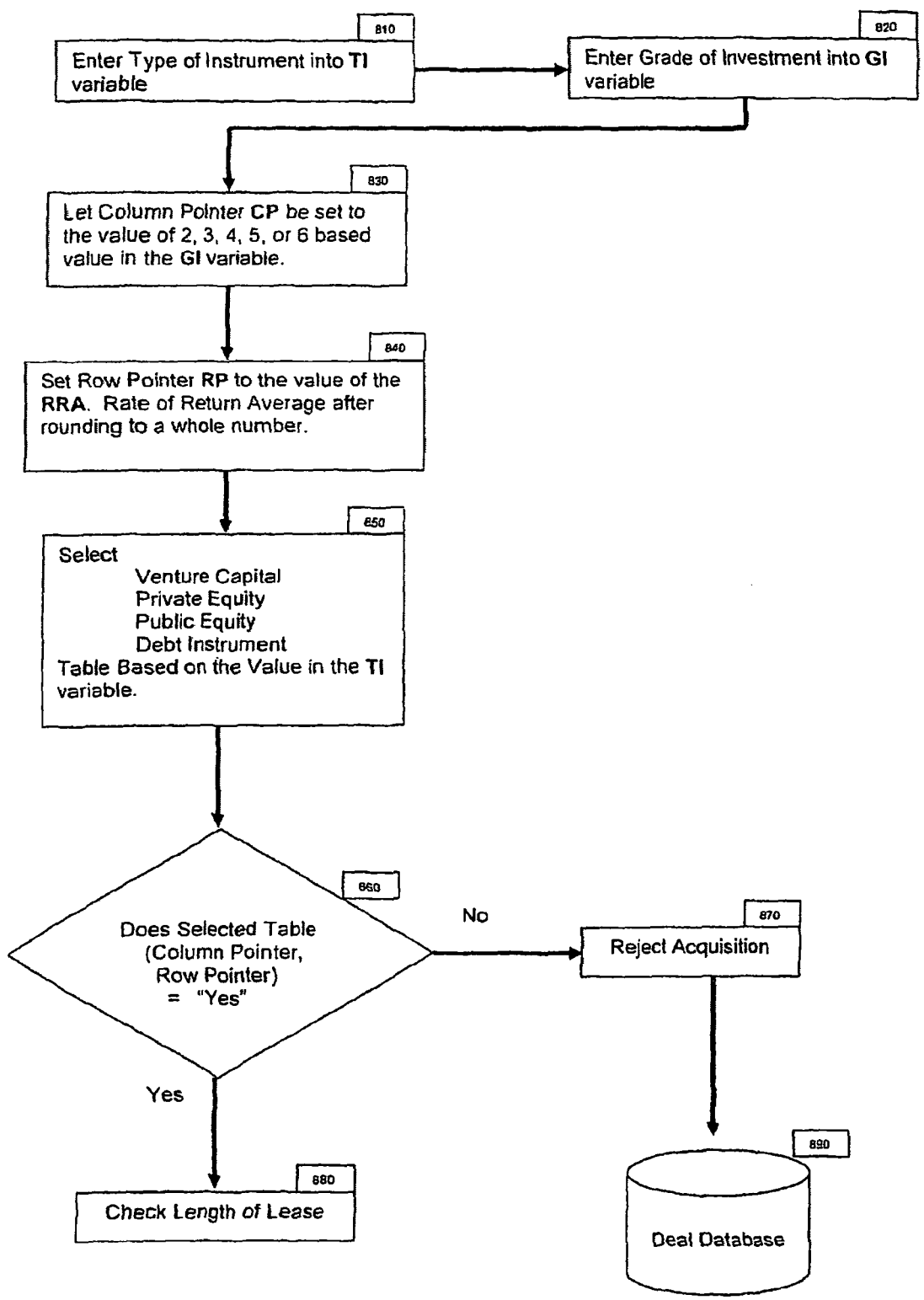
FIG. 8 is a flowchart illustrating the steps for selecting a collateral instrument using the data collected.

Once the core data is collected, it will be subjected to the calculations resulting in the rate of return required by the risk mitigation process 350 of FIG. 3 which is shown in detail in FIG. 8 and uses the results to perform the selection process.

At the end of the selection process illustrated in FIGS. 6 and 7 the following calculations will have been performed:

| | |
|---|---|
| TPP = | LPP + LAF$ |
| FMVE = | EEPP * NU |
| REOL = | (EEPP * NU) * (100 − AD%) |
| SLD = | (TPP − FMVE)/LOL |
| LAF% = | LAF$/(EPP * NU) |
| ACFY = | SUM (YP, 1 to LOL)/LOL/TPP |
| PPM = | YP (1)/12 |

-continued

| | |
|---|---|
| PPY = | YP(1) * 12 |
| FMVS (TP) = | EPP * NU + LAF$ − SLD |
| FMVA (TP) = | EPP * NU . |
| RR (TP) = | (YP (TP) − TPP − (FMVA (TP)))/LPP |
| FMVS (TP) = | FMVS (TP − 1) − SLD |
| FMVA (TP) = | FMVA (TP − 1) − FMVE * AD% |
| RR (TP) = | YP (TP − 1) − TPP − FMVA (TP − 1)/TP/LPP |
| RRT = | RR(TP) + RRT |
| RRA = | RRT/LOL |

FIG. 8 represents one of the processes mentioned in FIG. 3, risk mitigation, 350. The acquisition selection process represented in FIG. 6, which is part of risk mitigation, 350, collects two data elements through data entry by a user agent, 360, and stores them in variables to be used with the variables collected and calculated in the deal filter process, 320. The primary objective of the steps in FIG. 8 is to set up pointers to identify the tables to use from Tables 1-5 below and the exact row and column address to the value stored in the table. The values stored in the tables determine whether a proposed acquisition is accepted or rejected.

The TI variable represents the type of financial instrument. There are four types of financial instruments considered, venture capital, private equity, public equity, and debt instruments. A table representing each one of these financial instruments is presented below. Contained in these tables is information about level of risk that dictates whether the acquisition is accepted or rejected based on the calculated rate of return. This entered variable, TI, identifies which table will be used.

Following are Tables 1-5. Tables 1-4 contain information relating to the level of risk and are used to decide whether the acquisition should be accepted or rejected based on the calculated rate of return RR. Table 5 provides a selection criteria based on the length of the lease.

Table 1—Contains rate of return, investment grade ratings and selection criteria that is used by the collected variables and rate of return formula to determine whether the lease can be used as a tiered derivative for Venture Capital.

Table 2—Contains rate of return, investment grade ratings and selection criteria that is used by the collected variables and rate of return formula to determine whether the lease can be used as a tiered derivative for Private Equity.

Table 3—Contains rate of return, investment grade ratings and selection criteria that is used by the collected variables and rate of return formula to determine whether the lease can be used as a tiered derivative for Public Equity.

Table 4—Contains rate of return, investment grade ratings and selection criteria that is used by the collected variables and rate of return formula to determine whether the lease can be used as a tiered derivative for Debt Instruments.

Table 5—Contains number of years before the lease is liquidated, and the type of tiered derivative as calculated by length of lease formula to determine which tiered derivative best fits the selection criteria.

TABLE 1

Venture Capital Acquisition Table

| Venture Capital | Investment Grade Rating | | | | |
|---|---|---|---|---|---|
| Rate of Return | <BBB | BBB | -A- | -AA- | AAA |
| 1.00% | No | No | No | No | No |
| 2.00% | No | No | No | No | No |
| 3.00% | No | No | No | No | No |
| 4.00% | No | No | No | No | No |
| 5.00% | No | No | No | No | No |
| 6.00% | No | No | No | No | No |

TABLE 1-continued

| | | | | | |
|---|---|---|---|---|---|
| 7.00% | No | No | No | No | No |
| 8.00% | No | No | No | No | No |
| 9.00% | No | No | No | No | No |
| 10.00% | No | No | No | No | No |
| 11.00% | No | No | No | No | No |
| 12.00% | No | No | No | No | Yes |
| 13.00% | No | No | No | Yes | Yes |
| 14.00% | No | No | Yes | Yes | Yes |
| 15.00% | No | Yes | Yes | Yes | Yes |
| 16.00% | No | Yes | Yes | Yes | Yes |
| 17.00% | No | Yes | Yes | Yes | Yes |
| 18.00% | No | Yes | Yes | Yes | Yes |
| 19.00% | No | Yes | Yes | Yes | Yes |
| 20.00% | No | Yes | Yes | Yes | Yes |

VC = Venture Capital
TI = Type of Instrument
GI = Grade of Investment
RR = Rate of Return
CP = Column Pointer
RP = Row Pointer
If TI = "Venture Capital" Then Use VC Acquisition Table
If GI = "<BBB" Then CP is 2
If GI = "BBB" Then CP is 3
If GI = "A" Then CP is 4
If GI = "AA" Then CP is 5
If GI = "AAA" Then CP is 6
RP = the value of RR
If VC Acquisition Table(CP, RP) not = "YES"
Then Reject Acquisition
End-If

TABLE 2

Private Equity Acquisition Table

| Private Equity | Investment Grade Rating | | | | |
|---|---|---|---|---|---|
| Rate of Return | <BBB | BBB | -A- | -AA- | AAA |
| 1.00% | No | No | No | No | No |
| 2.00% | No | No | No | No | No |
| 3.00% | No | No | No | No | No |
| 4.00% | No | No | No | No | No |
| 5.00% | No | No | No | No | No |
| 6.00% | No | No | No | No | No |
| 7.00% | No | No | No | No | No |
| 8.00% | No | No | No | No | No |
| 9.00% | No | No | No | No | No |
| 10.00% | No | No | No | No | Yes |
| 11.00% | No | No | No | Yes | Yes |
| 12.00% | No | No | Yes | Yes | Yes |
| 13.00% | No | Yes | Yes | Yes | Yes |
| 14.00% | No | Yes | Yes | Yes | Yes |
| 15.00% | No | Yes | Yes | Yes | Yes |
| 16.00% | No | Yes | Yes | Yes | Yes |
| 17.00% | No | Yes | Yes | Yes | Yes |
| 18.00% | No | Yes | Yes | Yes | Yes |
| 19.00% | No | Yes | Yes | Yes | Yes |
| 20.00% | No | Yes | Yes | Yes | Yes |

PE = Private Equity
TI = Type of Instrument
GI = Grade of Investment
RR = Rate of Return
CP = Column Pointer
RP = Row Pointer
If TI = "Private Equity" Then Use PE Acquisition Table
If GI = "<BBB" Then CP is 2
If GI = "BBB" Then CP is 3
If GI = "A" Then CP is 4
If GI = "AA" Then CP is 5
If GI = "AAA" Then CP is 6
RP = the value of RR
If PE Acquisition Table(CP, RP) not = "YES"
Then Reject Acquisition
End-If

TABLE 3

Public Equity Acquisition Table

| Public Equity | Investment Grade Rating | | | | |
|---|---|---|---|---|---|
| Rate of Return | <BBB | BBB | -A- | -AA- | AAA |
| 1.00% | No | No | No | No | No |
| 2.00% | No | No | No | No | No |
| 3.00% | No | No | No | No | No |
| 4.00% | No | No | No | No | No |
| 5.00% | No | No | No | No | No |
| 6.00% | No | No | No | No | No |
| 7.00% | No | No | No | No | No |
| 8.00% | No | No | No | No | No |
| 9.00% | No | No | No | No | Yes |
| 10.00% | No | No | No | Yes | Yes |
| 11.00% | No | No | Yes | Yes | Yes |
| 12.00% | No | Yes | Yes | Yes | Yes |
| 13.00% | No | Yes | Yes | Yes | Yes |
| 14.00% | No | Yes | Yes | Yes | Yes |
| 15.00% | No | Yes | Yes | Yes | Yes |
| 16.00% | No | Yes | Yes | Yes | Yes |
| 17.00% | No | Yes | Yes | Yes | Yes |
| 18.00% | No | Yes | Yes | Yes | Yes |
| 19.00% | No | Yes | Yes | Yes | Yes |
| 20.00% | No | Yes | Yes | Yes | Yes |

PBE = Public Equity
TI = Type of Instrument
GI = Grade of Investment
RR = Rate of Return
CP = Column Pointer
RP = Row Pointer
If TI = "Public Equity" Then Use PBE Acquisition Table
If GI = "<BBB" Then CP is 2
If GI = "BBB" Then CP is 3
If GI = "A" Then CP is 4
If GI = "AA" Then CP is 5
If GI = "AAA" Then CP is 6
RP = the value of RR
If PBE Acquisition Table(CP, RP) not = "YES"
Then Reject Acquisition
End-If

TABLE 4

Debt Instruments Acquisition Table

| Debt Instruments | Investment Grade Rating | | | | |
|---|---|---|---|---|---|
| Rate of Return | <BBB | BBB | -A- | -AA- | AAA |
| 1.00% | No | No | No | No | No |
| 2.00% | No | No | No | No | No |
| 3.00% | No | No | No | No | No |
| 4.00% | No | No | No | No | No |
| 5.00% | No | No | No | No | No |
| 6.00% | No | No | No | No | No |
| 7.00% | No | No | No | No | No |
| 8.00% | No | No | No | No | Yes |
| 9.00% | No | No | No | Yes | Yes |
| 10.00% | No | No | Yes | Yes | Yes |
| 11.00% | No | Yes | Yes | Yes | Yes |
| 12.00% | No | Yes | Yes | Yes | Yes |
| 13.00% | No | Yes | Yes | Yes | Yes |
| 14.00% | No | Yes | Yes | Yes | Yes |
| 15.00% | No | Yes | Yes | Yes | Yes |
| 16.00% | No | Yes | Yes | Yes | Yes |
| 17.00% | No | Yes | Yes | Yes | Yes |
| 18.00% | No | Yes | Yes | Yes | Yes |

TABLE 4-continued

| 19.00% | No | Yes | Yes | Yes | Yes |
| 20.00% | No | Yes | Yes | Yes | Yes |

DI = Debt Instruments
TI = Type of Instrument
GI = Grade of Investment
RR = Rate of Return
CP = Column Pointer
RP = Row Pointer
If TI = "Debt Instruments" Then Use DI Acquisition Table
If GI = "<BBB" Then CP is 2
If GI = "BBB" Then CP is 3
If GI = "A" Then CP is 4
If GI = "AA" Then CP is 5
If GI = "AAA" Then CP is 6
RP = the value of RR
If DI Acquisition Table(CP, RP) not = "YES"
Then Reject Acquisition
End-If

TABLE 5

Length of Lease Table

| No. of Years | VC | PE | PBE | DI |
|---|---|---|---|---|
| 1 | No | No | Yes | Yes |
| 2 | No | No | Yes | Yes |
| 3 | No | Yes | Yes | Yes |
| 4 | No | Yes | Yes | Yes |
| 5 | Yes | Yes | Yes | Yes |
| 6 | Yes | Yes | No | Yes |
| 7 | Yes | Yes | No | Yes |
| 8 | Yes | Yes | No | Yes |
| 9 | Yes | Yes | No | Yes |
| 10 | Yes | Yes | No | Yes |

NOY = Number of Years
CP = Column Pointer
RP = Row Pointer
TI = Type of Instrument
LLM = Length of Lease in Months
NOY = LLM/12
RP = NOY
If TI = "Venture Capital" Then CP = 2
If TI = "Private Equity" Then CP = 3
If TI = "Public Equity" Then CP = 4
If TI = "Debt Instrument" Then CP = 5
If Length of Lease Table(CP, RP) not = "YES"
Then Reject Acquisition
End-If The GI variable represents the grade of the investment. There are five grades of investment that are considered. These grades are considered credit ratings and are maintained by an external source such as Dun & Bradstreet. The grades contained in the tables are "<BBB", "BBB", "A", "AA" and "AAA". This variable is used to point to a column in each of the previously mentioned financial instrument tables.

Now turning to FIG. 8 the process for accepting or rejecting an acquisition based on the rate of return is illustrated. The TI variable is entered by the user agent 360 in FIG. 3 and represents the type of instrument, step 810. The GI variable is entered by the user agent 360 in FIG. 3 and represents the grade of investment, step 820. Logic is applied based on the entered GI value setting the CP variable, which is a column pointer, to 2, 3, 4, 5, or 6, step 830. Logic is applied based on the value of the Rate of Return Average, RRA variable, which was calculated in step 716 in FIG. 7, to set the RP value, which is the row pointer, step 840. A logic statement will select the proper table from Tables 1-4 based on the value of TI, the type of instrument, step 850, and use the CP, column pointer from step 830 and RP, row pointer from step 840 to determine which value to check in the selected table, step 860. The logic statement will determine whether the acquisition will be rejected, step 870, or accepted, step 880. The deal database, 890, will be updated with the decision.

Figure 9:
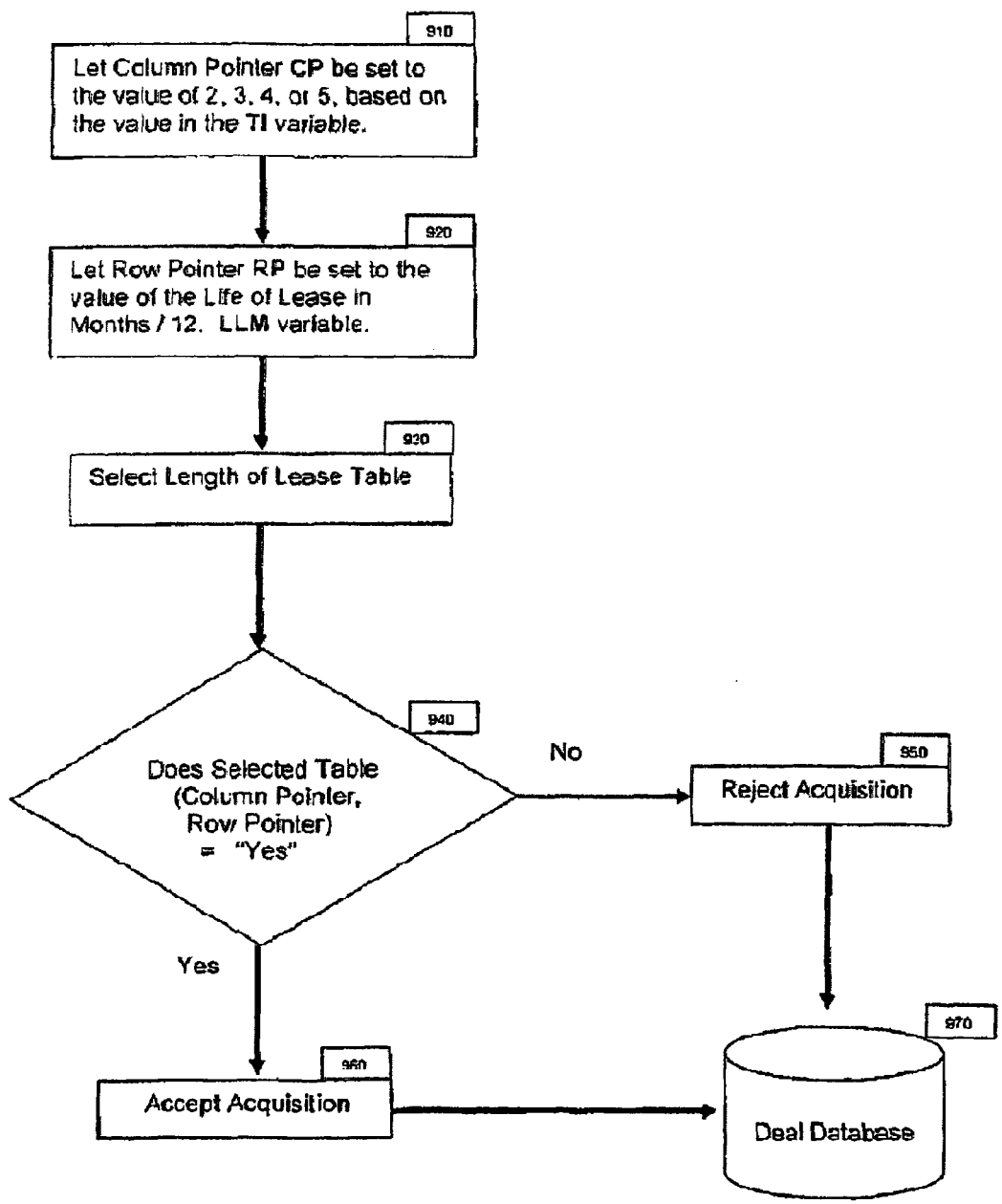
FIG. 9 is a flowchart illustrating the default steps for determining whether a collateral instrument meets the length of lease requirement set forth in accordance with the principles of the invention.

FIG. 9 represents the other process mentioned in FIG. 3, risk mitigation, 350. The check length of lease process represented in FIG. 9, which is part of risk mitigation, 350, checks the time left on the lease. This process has all of the data elements necessary to point to the information in Table 5, length of lease table. Logic is applied based on the entered TI value, which is the type of instrument, setting the CP variable, which is a column pointer, to 2, 3, 4, or 5, step 910. Logic is applied setting the RP variable, row pointer to the LLM variable, life of lease in months divided by 12, step 920. A logic statement will select Table 5, length of lease table, and use the CP, column pointer from step 910 and RP, row pointer from step 920 to determine which value to check in the table 5, step 930. The logic statement, step 940 will determine whether the acquisition will be rejected, step 950 or accepted, step 960. The deal database, 970, will be updated with the decision.

Now turn to FIG. 10 for a representation of the selection optimization process. Its purpose is to determine whether the default values (Tables 1-5) will be used to optimize the selection or whether to use the variables entered by the buyer. The method does this by selecting data from the deal database, 1010, which is the same as the deal database 890 and 970 for buyer-entered variables in step 1015. Step 1020 determines if buyer variables exist. If no variables exist, then the deal is checked in step 1025 to determine if it was rejected. If the deal was not rejected, then the default values from Tables 1-5 are used to generate the deal sheet, in step 1030. If the deal was rejected based on the default values then the process ends at step 1035.

If step 1020 determines that there are buyer variables, the optimization process begins by sorting the lease acquisition selection by the rate of return results in ascending order, step 1040. This uses the dynamic table pointer to isolate and sort data items. Once the items are sorted, step 1045 selects leases using the buyer input variables as criteria to the database retrieval language which dynamically constructs statements that identifies and retrieves a subset of leases meeting the criteria. Step 1050 determines whether the lease meets the buyers criteria, if does not, step 1055 checks to see if the default process rejected the deal. If the deal was not rejected step 1060 generates a deal sheet. If the deal was rejected, then the process ends with step 1080.

If the buyer criteria is meant using the buyer input variables in step 1050, then a deal sheet is created in step 1070. Step 1090 checks to see if other leases apply. If other leases apply, the process branches to step 1045, otherwise the process is ended in step 1080.

Thus, it is apparent that in accordance with the present invention, a method and an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the claims.

We claim:
1. A method for selecting collateral instruments to optimize an investment portfolio comprising the steps of:
   a. receiving dynamic data pertaining to collateral instruments;

b. calculating by computer a rate of return of investing in said collateral instruments;

c. selecting by computer collateral instruments based on an investment rate of return; and d. using the selected collateral instruments to create financial instrument derivatives and optimize the investment portfolio by computer, wherein the financial instrument derivatives are backed by the selected collateral instruments, wherein said collateral instruments each comprise a financial instrument having a principal component and an interest component and providing a calculated low risk and a calculated high cash flow.

2. The method of claim 1 wherein the selected collateral instruments are selected from a group comprising stocks, equipment leases, bonds, assets, receivables, debt instruments, treasury bills, preferred stock, asset backed securities, securities, credit card debt and mortgages.

3. The method of claim 1 wherein the appropriate investment rate of return is dependent on an investment grade rating of a type of investment vehicle.

4. The method of claim 3 wherein the type of investment vehicle is one of venture capital, private equity, public equity, asset-backed securities and/or debt instruments.

5. The method of claim 1 wherein the collateral instruments and the financial instrument derivatives are used to form a two tier investment structure.

6. The method of claim 4 wherein the two tier investment structure is applied to a venture capital environment, private equity, public equity, asset-backed securities and/or debt instruments.

7. The method of claim 1 wherein collateral instruments are selected to create a securities trading exchange.

8. An apparatus for facilitating a selection of collateral instruments to optimize an investment portfolio comprising:
a storage device;
a processor connected to the storage device,
the storage device storing a program for controlling the processor, wherein the processor operates with the program for
receiving dynamic data pertaining to collateral instruments;
calculating by computer a rate of return of investing in said collateral instruments;
selecting by computer collateral instruments based on an investment rate of return; and
using the selected collateral instruments to create financial instrument derivatives and optimize the investment portfolio by computer, wherein the financial instrument derivatives are backed by the collateral instruments,
wherein the selected collateral instruments each comprise a financial instrument having a principal component and an interest component and providing a calculated low risk and a calculated high cash flow.

9. The apparatus of claim 8 wherein the selected collateral instruments are selected from a group comprising stocks, equipment leases, bonds, assets, receivables, debt instruments, treasury bills, preferred stock, asset backed securities, securities credit card debt and mortgages.

10. The apparatus of claim 8 wherein an appropriate rate of return is dependent on an investment grade rating of a type of investment vehicle.

11. The apparatus of claim 10 wherein the type of investment vehicle is one of venture capital, private equity, public equity, asset-backed securities and/or debt instruments.

12. The apparatus of claim 8 wherein the collateral instruments and the financial instrument derivatives are used to form a two tier investment structure.

13. The apparatus of claim 12 wherein the two tier investment structure is applied to a venture capital environment, private equity, public equity, asset-backed securities and/or debt instruments.

14. The apparatus of claim 8 wherein collateral instruments are selected to create a securities trading exchange.

\* \* \* \* \*